United States Patent [19]

Pantone et al.

[11] Patent Number: 4,490,301

[45] Date of Patent: Dec. 25, 1984

[54] LIQUID DIPHENYLMETHANE DIISOCYANATE COMPOSITIONS

[75] Inventors: Richard S. Pantone, New Martinsville, W. Va.; Helmut F. Reiff, Leverkusen, Fed. Rep. of Germany

[73] Assignee: Mobay Chemical Corporation, Pittsburgh, Pa.

[21] Appl. No.: 538,055

[22] Filed: Sep. 30, 1983

[51] Int. Cl.$^3$ .................... C07C 69/00; C07C 125/06
[52] U.S. Cl. .................... 260/453 SP; 260/453 AM; 560/26; 560/27; 521/155; 521/159
[58] Field of Search ............... 260/453 AM, 453 SP; 560/26, 27

[56] References Cited

U.S. PATENT DOCUMENTS

| | | | |
|---|---|---|---|
| 3,152,162 | 10/1964 | Fischer et al. | 260/453 |
| 3,384,653 | 5/1968 | Erner et al. | 260/453 |
| 3,394,165 | 7/1968 | McClellan et al. | 260/453 |
| 3,449,256 | 6/1969 | Farrissey et al. | 252/182 |
| 3,640,966 | 2/1972 | Hennig et al. | 260/77.5 R |
| 3,641,093 | 2/1972 | Brooks et al. | 260/453 AR |
| 3,644,457 | 2/1972 | König et al. | 260/453 SP |
| 3,674,828 | 7/1972 | Brooks et al. | 260/453 P |
| 3,701,796 | 10/1972 | Saaty et al. | 260/453 SP |
| 3,883,571 | 5/1975 | Allport et al. | 260/453 AM |
| 4,014,935 | 3/1977 | Ibbotson | 260/566 R |
| 4,031,026 | 6/1977 | Ibbotson | 252/182 |
| 4,055,548 | 10/1977 | Carleton et al. | 260/77.5 AT |
| 4,088,665 | 5/1978 | Findeisen et al. | 260/453 AM |
| 4,102,833 | 7/1978 | Salisbury | 521/159 |
| 4,115,429 | 9/1978 | Reiff et al. | 260/453 SP |
| 4,118,411 | 10/1978 | Reiff et al. | 260/453 SP |
| 4,154,752 | 5/1979 | Sundermann et al. | 260/453 SP |
| 4,177,205 | 12/1979 | Schaaf et al. | 260/453 AM |
| 4,229,347 | 10/1980 | Holt et al. | 260/239 A |
| 4,261,852 | 4/1981 | Carroll et al. | 528/59 |
| 4,321,333 | 3/1982 | Alberino et al. | 521/159 |
| 4,332,742 | 6/1982 | Allen | 260/453 SP |

*Primary Examiner*—Alan Siegel
*Attorney, Agent, or Firm*—Gene Harsh; Joseph C. Gil

[57] ABSTRACT

The present invention is directed to a process for the production of an isocyanate which is both stable and liquid at room temperature comprising reacting pure diphenylmethane diisocyanate or crude diphenylmethane diisocyanate with the monoallyl ether of trimethylolpropane at a temperature of from 20° to 110° C., in such a ratio that the resultant product has an isocyanate group content of from 20 to 30%, by weight, and the product resulting therefrom.

7 Claims, No Drawings

LIQUID DIPHENYLMETHANE DIISOCYANATE COMPOSITIONS

The invention relates to organic isocyanates and mixtures of organic isocyanates based on diphenylmethane diisocyanates which are liquid at room temperature. The invention also relates to a process for preparing these isocyanates.

BACKGROUND OF THE INVENTION

Diisocyanates which are liquid at room temperature have numerous advantages over solid diisocyanates. Diisocyanates which are liquid at room temperature, such as toluene diisocyanate or hexamethylene diisocyanate, are, as a rule, physiologically harmful because of their high vapor pressure. For this reason, various attempts have been made to start with diisocyanates that are solid at room temperature and convert these into the liquid form.

The most commercially important diisocyanates which are solid at room temperature are 4,4'-diphenylmethane diisocyanate and the 2,4'-isomer thereof, which melt at 39° C. and 34.5° C., respectively.

Numerous patents have issued relating to the liquification of diphenylmethane diisocyanate. See, for example, U.S. Pat. Nos. 3,152,162; 3,384,653; 3,394,165; 3,449,256; 3,640,966; 3,641,093; 3,674,828; 3,701,796; 3,883,571; 4,014,935; 4,055,548; 4,088,665; 4,031,026; 4,102,833; 4,115,429; 4,118,411; 4,154,752; 4,177,205; 4,229,347; 4,261,852; 4,321,333; and 4,332,742.

It is an object of this invention to provide improved organic isocyanates which are liquid at room temperature. A further object of this invention is to provide organic isocyanates which remain liquid even on prolonged storage at low temperatures. Still another object of this invention is to provide an improved process for preparing liquid organic isocyanates.

DESCRIPTION OF THE INVENTION

The instant invention is directed to a process for preparing a liquid modified diphenylmethane diisocyanate comprising reacting pure diphenylmethane diisocyanate or crude diphenylmethane diisocyanate with the monoallylether of trimethylol propane at a temperature between about 20° and about 110° C., preferably between 40° and 80° C., and most preferably between 50° and 70° C., in such a ratio of isocyanate to hydroxyl groups as to produce a product having an isocyanate group content of from 20 to 30 percent, by weight, and preferably of from 22 to 28 percent, by weight. In general, the weight ratio of isocyanate to diol will be from 5:1 to 15:1 and preferably from 7:1 to 15:1. The liquid modified isocyanate may also be prepared as a concentrate (that is, with a lower percent isocyanate group content) and diluted with additional isocyanate to adjust the isocyanate content to the desired level. The instant invention is also directed to isocyanates which are both stable and liquid at room temperature, prepared according to the above-noted process.

As used herein, the phrase "pure diphenylmethane diisocyanate" means 2,2'-diphenylmethane diisocyanate, 2,4'-diphenylmethane diisocyanate, 4,4'-diphenylmethane diisocyanate, and mixtures thereof. The phrase is also intended to include a mixture of one or more of the isomers noted with up to 5% by weight of a tri- and/or higher isocyanate of the diphenylmethane type.

As used herein, the phrase "crude diphenylmethane diisocyanate" means an isocyanate mixture which is either (a) a phosgenation product of an undistilled bottom fraction of the type formed during the removal of from 10 to 95 percent by weight of diphenylmethane diamine from an aniline/formaldehyde condensate, or (b) an undistilled bottom fraction of the type obtained during the removal of from 10 to 95 percent by weight of diphenylmethane diisocyanate from the crude phosgenation product of aniline/formaldehyde condensate, wherein the isocyanate mixture:

(i) has a viscosity of from 10 to 600 cps at 50° C.,
(ii) has an isocyanate group content of from about 28 to about 33 percent by weight, and
(iii) contains from 25 to 95 percent by weight of diphenylmethane diisocyanate of which from 1 to 50% by weight is the 2,4'-isomer, from 0 to 10% by weight is the 2,2'-isomer, and the balance is the 4,4'-isomer.

The liquid isocyanates which can be prepared according to the invention have a very low viscosity and can therefore be processed very easily, such as by casting or metering through pumps. Additionally, they have a very low vapor pressure and are, therefore, less physiologically harmful.

In general, the process may be carried out by introducing the diol into the isocyanate at temperatures from 20° to 110° C., with stirring. The isocyanate content of the product of the process amounts to from 20 to 30 percent, by weight, and preferably to from 22 to 28 percent by weight.

The products of the present invention can be used for many different polyaddition reactions in the lacquer and plastics industry. For example, they may be use in the production of polyurethane foams and elastomers, such as in reaction injection molding (RIM) products.

The invention is further illustrated, but is not intended to be limited by the following examples in which all parts and percentages are by weight unless otherwise specified.

In the examples which follow, the following isocyanates were used:

(a) MDI-98: an isocyanate mixture consisting of 98 percent by weight of 4,4'-diphenylmethane diisocyanate and 2 percent by weight of 2,4'-diphenylmethane diisocyanate.

(b) MDI-35: an isocyanate mixture consisting of 35 percent by weight of 4,4'-diphenylmethane diisocyanate, 64 percent by weight of 2,4'-diphenylmethane diisocyanate and 1 percent by weight of 2,2'-diphenylmethane diisocyanate.

(c) MDI-42: an isocyanate mixture consisting of 42 percent by weight of 4,4'-diphenylmethane diisocyanate, 57 percent by weight of 2,4'-diphenylmethane diisocyanate, and 1 percent by weight of 2,2'-diphenylmethane diisocyanate.

(d) CRUDE MDI-10: a crude diphenylmethane diisocyanate having a viscosity of 20 cps at 50° C., an isocyanate group content of 33.2 percent by weight, and containing 90 percent by weight of diphenylmethane diisocyanate of which about 98 percent by weight was the 4,4'-isomer and about 2 percent by weight was the 2,4'-isomer.

(e) CRUDE MDI-25: a crude diphenylmethane diisocyanate having a viscosity of 35 cps at 50° C., an isocyanate group content of 32.6% by weight, and containing 75% by weight of diphenylmethane diisocyanate of which about 97% by weight was the 4,4'-isomer and about 3% by weight was the 2,4'-isomer.

(f) CRUDE MDI-50: a crude diphenylmethane diisocyanate having a viscosity of 60 cps at 50° C., an isocyanate group content of 31.6% by weight, and containing 50% by weight of diphenylmethane diisocyanate of which about 96% by weight was the 4,4'-isomer and about 4% by weight was the 2,4'-isomer.

(g) CRUDE MDI-45: a crude diphenylmethane diisocyanate having a viscosity of 50 cps at 50° C., an isocyanate content of 31.6% by weight, and containing 55% by weight of diphenylmethane diisocyanate of which about 69% by weight was the 4,4'-isomer and about 27% by weight was the 2,4'-isomer and 4% by weight of the 2,2'isomer.

EXAMPLES

Example 1

87 parts by weight of trimethylolpropane monoallyl ether were added over a period of 30 minutes to 600 parts by weight MDI-98 which has been heated to 50° C. After the reaction mixture was heated for 3 hours at 60°-65° C., a liquid, stable product resulted which had an isocyanate group content of 23.2% and a viscosity of 486 cps at 25° C.

Example 2

87 parts by weight of trimethylolpropane monoallyl ether were added over a period of 30 minutes to 870 parts by weight of MDI-98, which had been heated to 50° C. After the reaction mixture was heated for 3 hours at 60°-65° C., a liquid, stable product resulted, which had an isocyanate group content of 26.0% and a viscosity of 106 cps at 25° C.

Example 3

87 parts by weight of trimethylolpropane monoallyl ether was added over a period of 10 minutes to 600 parts by weight of MDI-35, which had been heated to 30° C. After the reaction mixture was heated for 4 hours at 70°-75° C., a liquid, stable product resulted, which had an isocyanate group content of 23.3% and a viscosity of 728 cps at 25° C.

Example 4

87 parts by weight of trimethylolpropane monoallyl ether was added over a period of 10 minutes to 870 parts by weight of MDI-42 which had been heated to 30° C. After the reaction mixture was heated for 4 hours at 70°-75° C., a liquid, stable product resulted, which had an isocyanate group content of 28.3% and a viscosity of 56 cps at 25° C.

Example 5

87 parts by weight of trimethylolpropane monoallyl ether were added over a period of 20 minutes to 600 parts by weight of CRUDE MDI-10, which had been heated to 50° C. After the reaction mixture was stirred for 3 hours at 60°-65° C., a liquid, stable product resulted, which had an isocyanate group content of 22.8% and a viscosity of 1,326 cps at 25° C.

Example 6

87 parts by weight of trimethylolpropane monoallyl ether was added over a period of 20 minutes to 1,300 parts by weight of CRUDE MDI-10, which had been heated to 50° C. After the reaction mixture was stirred for 3 hours at 60°-65° C., a liquid, stable product resulted, which had an isocyanate group content of 28.0% and a viscosity of 80 cps at 25° C.

Example 7

87 parts by weight of trimethylolpropane monoallyl ether were added over a period of 15 minutes to 1,300 parts by weight of CRUDE MDI-25, which had been heated to 40° C. After the reaction mixture was stirred for 4 hours at 70°-75° C., a liquid, stable product resulted, which had an isocyanate group content of 27.4% and a viscosity of 266 cps at 25° C.

Example 8

87 parts by weight of trimethylolpropane monoallyl ether were added over a period of 15 minutes to 1,300 parts by weight of CRUDE MDI-50 which had been heated to 40° C. After the reaction mixture was stirred for 4 hours at 70°-75° C., a liquid, stable product resulted, which had an isocyanate group content of 26.4% and a viscosity of 5,000 cps at 25° C.

Example 9

87 parts by weight of trimethylolpropane monoallyl ether were added over a period of 15 minutes to 1,300 parts by weight of CRUDE MDI-45 which had been heated to 40° C. After the reaction mixture was stirred for 4 hours at 70°-75° C., a liquid, stable product resulted, which had an isocyanate group content of 26.6% and a viscosity of 4,390 cps at 25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an isocyanate which is both stable and liquid at room temperature comprising reacting pure diphenylmethane diisocyanate or crude diphenylmethane diisocyanate with the monoallyl ether of trimethylolpropane at a temperature of from 20° to 110° C., in such a ratio that the resultant product has an isocyanate group content of from 20 to 30%, by weight.

2. The process of claim 1 wherein the temperature is from 40° to 80° C.

3. The process of claim 2, wherein the temperature is from 50° to 70° C.

4. The process of claim 1, wherein the isocyanate group content of the product is from 22 to 28 perecent by weight.

5. The process of claim 1, wherein the weight ratio of the isocyanate to the monoallyl ether of trimethylolpropane is from 5:1 to 15:1.

6. An isocyanate prepared by reacting pure diphenylmethane diisocyanate or crude diphenylmethane diisocyanate with the monoallyl ether of trimethylolpropane at a temperature of from 20° to 110° C., in such a ratio that the resultant product has an isocyanate group content of from 20 to 30%, by weight.

7. The product of claim 6 wherein the isocyanate group content is from 22 to 28 percent by weight.

* * * * *